Jan. 17, 1956 J. C. DARLING ET AL 2,731,204

METHOD OF COUNTING ARTICLES

Filed May 1, 1951

Inventors
J. C. DARLING
JOHN HAYES

By Rule and Hoge

Attorneys 2,731,204
Patented Jan. 17, 1956

2,731,204

METHOD OF COUNTING ARTICLES

Jack C. Darling and John Hayes, Streator, Ill., assignors to Owens-Illinois Glass Company, a corporation of Ohio Application May 1, 1951, Serial No. 223,934
8 Claims. (Cl. 235—98)

Figure 1:
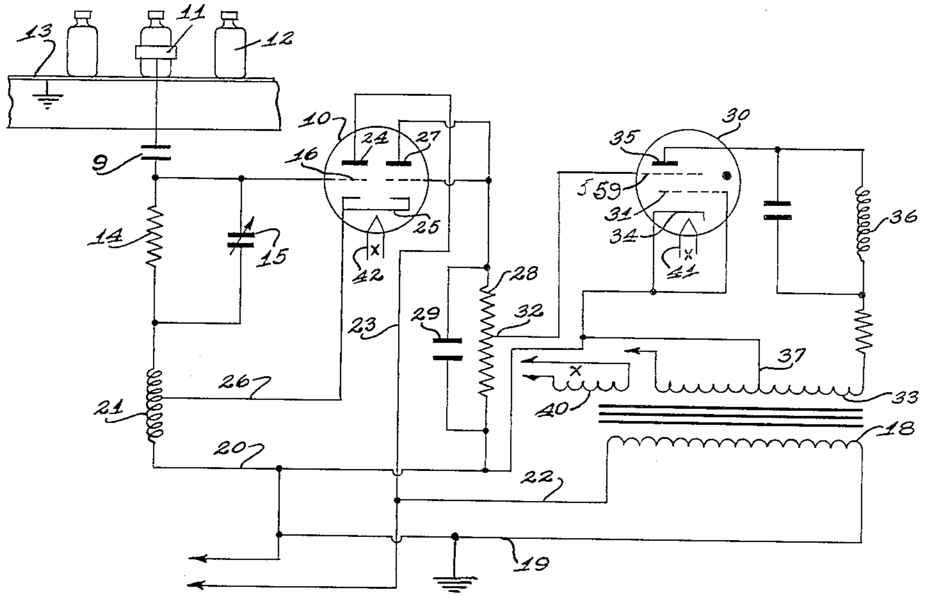

Our invention relates to methods and apparatus by which various articles or objects, when brought in proximity to an electronic detecting device or target produce an electric impulse which may be amplified and used to operate various indicating devices, safety devices and other mechanisms. The invention has utility when used, for example, for operating counters for counting various articles.

As herein illustrated and described the invention is adapted for counting glass articles during the process of manufacture and also for counting other articles, as, for example, the cartons in which such articles are packed. An important feature of the present invention relates to the provision of an apparatus of the type indicated which will actuate a counter or other device, without the use of electrical switches, moving contact elements or other moving parts. In the prior art devices, amplified electrical impulses or signals are commonly used to actuate a movable switch element or contact device for making and breaking a relay circuit. Our invention provides means for eliminating such moving parts.

Prior art devices used for actuating counters and various other mechanisms, commonly employ a photoelectric cell or electric eye to receive the signal impulses. Such devices, where attempts have been made to use them under certain conditions met with in practice, as for example, for counting articles at a high temperature or in an atmosphere of high humidity, have been found wholly impractical and inoperative as no type of photoelectric cell or light beam has been found which will stand such humidity. The present invention overcomes this difficulty by providing a signal device in the form of a metal plate or target which in cooperation with the articles being counted, provides a capacitance connected in a circuit of an oscillator and rectifier tube and operative to produce an electrical impulse when an article is brought into proximity thereto, such impulse being amplified and utilized for operating a counter or the like.

The invention in its preferred form comprises an oscillator, a rectifier, and a gas-filled tube or Thyratron. Glass bottles while at a sufficiently high temperature to be electrically conductive and function as a condenser plate, or other electrically conductive articles to be counted, are placed on a traveling conveyor and carried in succession past the target, which is insulated from the ground, while such articles have a ground connection through the conveyor. Each article as it passes in close proximity to the target cooperates therewith as a condenser which operates as hereinafter described to change the frequency and amplitude of the oscillator. This change in the magnitude of the oscillations lowers the output of the rectifier, which output is applied to the control grid of a gas-filled tube or Thyratron. The latter is thereby caused to conduct. An article counter comprises an electromagnetic coil connected in the plate circuit of the Thyratron so that when the latter is fired the counter is actuated.

Figure 2:
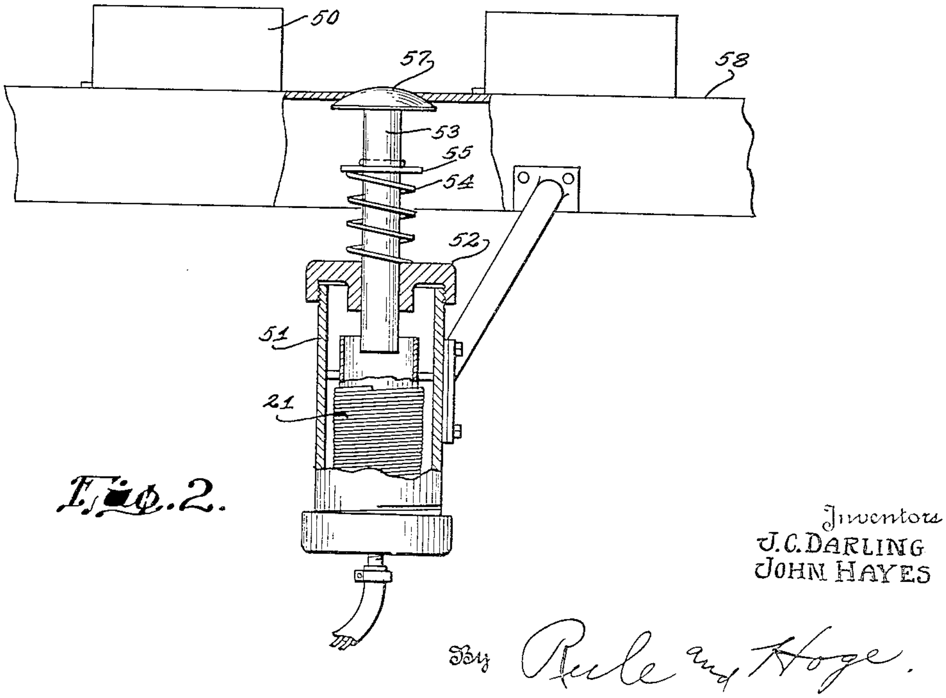

Referring to the accompanying drawings:

Fig. 1 is a diagrammatic view of an apparatus embodying the present invention as described for use in counting glass articles; and Fig. 2 is a part sectional elevation view with parts broken away, showing an electromagnetic device comprising an inductance coil connected in the signal circuit of the oscillator, Fig. 1, and used in counting cartons or other articles.

Referring to Fig. 1 the apparatus will now be described as used for counting glass articles such as bottles or jars during their transfer from the blowing machine to the annealing lehr. A target 11 which may be in the form of a steel plate insulated from the ground is stationary and located in close proximity to the path of the articles 12, here shown as bottles, which are carried in succession past the target by a conveyor 13. The conveyor 13 is an electrical conductor connected to ground so that the electrically conductive articles 12 carried thereby are grounded. Each article as it passes the stationary plate 11 cooperates therewith as a condenser and increases the capacitance between the plate 11 and ground. The glass bottles 12 or other glass articles are at a high temperature, usually red hot, at which temperature their electrical resistance is sufficiently low to permit them to function effectively as condenser plates or electrodes. The plate 11 is a metal which can continuously withstand the ambient temperatures, usually within a range of 400° to 700° F., as it comprises nothing which can burn out or be adversely affected by the heat. The target is preferably placed close to or at the entrance of the lehr in order to give an accurate count of the number of articles entering the lehr. The circuit box containing the control tubes is located at any convenient position outside of the high temperature zone of the lehr.

The oscillator half of the tube 10 receives its plate supply voltage from the supply source of the primary coil 18 of a transformer, one end of which coil is connected through wires 22, 23 to plate 24 of the oscillator. The circuit extends from the other end of the coil 18 through grounded wires 19, 20, the lower portion of induction coil 21 and wire 26 to the cathode 25. The upper half of the coil 21 is connected in the grid circuit and having an inductive coupling with the lower half of the coil, provides the feed back for the oscillator. The variable capacitor 15 and the resistor 14 in parallel therewith are connected between the coil 21 and the grid 16 of the oscillator. The capacitor 15 is adjustable for tuning the oscillator. The capacitor 9 is connected between the plate 11 and the parallel circuit of the resistor and capacitor 14—15 and insulates the plate 11 from ground.

The oscillator half of the tube 10 is of the conventional Hartley type and is self starting, operating at a frequency of many oscillations during each positive half cycle of the plate supply voltage. During the negative half cycles the oscillator is inoperative. The oscillator feed back and hence the intensity or magnitude of oscillations is controlled by the capacitance between the target 11 and ground. This capacitance is varied by the presence of articles 12 between the target 11 and the grounded conveyor 13. This is due to the fact that when a hot bottle on the grounded conveyor passes by and in close proximity to the target, the capacitance between the target and the ground or grounded conveyor is increased owing to the functioning of the target and bottle as a condenser when brought near each other. The capacitor 15 is set at the proper values for tuning or producing strong oscillations while no hot bottle 12 is passing the plate 11. When a hot bottle passes the plate the increased capacitance of the capacitor 11, 12 in series with the capacitor 9 and inductance 21, changes the Q of the circuit, or de-tunes the circuit from its resonant frequency, resulting in a decrease in the frequency and magnitude of the oscillations.

When the oscillator half of the tube 10 is operating, the generated voltage is rectified by the right half or rectifier portion of tube 10. Part of this voltage is taken from point 32 and applied as bias to the grid 59 of a gas-filled tube or Thyratron 30. As long as the magnitude of oscillations is maintained at a sufficiently high level, the grid bias is sufficient to keep the tube 30 from firing. The plate circuit of the tube 30 receives voltage from the secondary 33 of the transformer. The plate circuit extends from the plate 35 through an induction coil or counter 36 to the transformer coil 33 and from the coil 33 through wire 37 to the cathode 34. A secondary coil 40 of the transformer, supplies current to the filaments 41 and 42 of the tubes 30 and 10, respectively. The induction coil 36 operates and forms a part of the counter, which may be of usual or well-known construction adapted for counting the articles 12.

The operation is as follows:

The continuously traveling conveyor 13 carries the articles 12 in succession past the target 11. The articles are electrically conductive and grounded through the conveyor so that as each article is brought in front of the target 11, it cooperates therewith as a condenser and increases the capacitance between the target and the grounded article. This changes the Q of the oscillator circuit and causes a decrease in the magnitude of oscillations of the oscillator, which is oscillating during each positive half of the supply voltage cycle. This decrease in the magnitude of the oscillations is sufficient to lower the output of rectified voltage from the rectifier half of the tube 10. Since the rectified voltage is applied to the grid 59 of the Thyratron, the grid bias is lowered when the rectified voltage is lowered, thereby permitting the Thyratron to fire. The Thyratron fires on each positive half cycle of the plate supply voltage while the article 12 is passing the plate 11 and thereby energizes the counter 36. As the article moves away from the target and the magnitude of the oscillations is thereby increased, the Thyratron ceases to fire during the positive half cycles of the plate voltage so that the counter 36 is de-energized. The Thyratron and counter are thus automatically reset for the next operation. In this manner each article 12, as it passes the target, causes operation of the counter, which thereby registers the number of articles 12 which pass the target.

Fig. 2 illustrates a modification comprising an electromagnetic device for use in the circuit illustrated in Fig. 1. It may be used, for example, for counting cartons 50, in which the bottles 12 may be packed. This device comprises an electromagnet including the coil 21 (shown in Fig. 1) mounted within a tubular case 51, a cap 52 and an iron core 53 extending downwardly through an opening in the cap 52 into the coil 21. The core 53 is movable up and down a limited distance and is held in its upward position by a coil spring 54 surrounding the core and held under compression between the cap 52 and a collar 55 on the core. The core 53 is formed with a convex head 57. The cartons 50 travel on a conveyor 58. The head 57 protrudes upwardly into the path of the cartons and each carton as it moves forward, rides over the head 57 and depresses the core 53 a short distance. This results in a slight change in the inductance in the coil 21 resulting in a decrease in the magnitude of the oscillations of the oscillator. As in the previous form of the invention, this decrease in magnitude of the oscillations results in a decrease in the rectified voltage output of the rectifier which is applied to the grid of the Thyratron, causing the latter to operate in the same manner as above described. We have found that a slight movement of the core 53 of not more than ⅛ of an inch is sufficient to operate the apparatus.

Modifications may be resorted to within the spirit and scope of our invention.

We claim:

1. The method of counting glass articles which comprises heating the articles to a sufficiently high temperature to render them electrically conductive, grounding the articles, and while grounded and at said high temperature conveying them in succession past an electrically conductive element insulated from ground and close enough to the path of the articles to form with each passing article a capacitor, and as each article approaches said element, inducing in an electrical circuit an electrical impulse by the change in capacitance of said capacitor caused by the presence of each passing article.

2. The method defined in claim 1 and including the additional steps of amplifying said electrical impulses, and actuating a counter by the amplified impulses.

3. The method defined in claim 1, including maintaining an ambient temperature within a range of about 400° to 700° F. within the zone of the capacitor.

4. The method which comprises transferring glass articles from a blowing machine to an annealing lehr while the articles are at a red heat, positioning an electrically conductive element insulated from said articles close to the path of the articles during said transfer, and thereby causing each passing article to form with the said element a capacitor, inducing in an electrical circuit an electrical impulse caused by the change in capacitance of said capacitor produced by the presence of each passing article.

5. The method defined in claim 4, said method including changing the resonance and output of an electrical oscillator by said capacitance changes, rectifying the oscillating voltage, amplifying the rectified voltage, and actuating a counter by the amplified voltage.

6. The method defined in claim 4, said method including maintaining an ambient temperature within the range of about 400° to 700° F. during the passage of the articles past said electrically conductive element.

7. The method which comprises transferring glass articles from a blowing machine to an annealing lehr while the articles are at a red heat and causing each article during the transfer to pass in close proximity to an electrically conductive element positioned near the path of the articles, maintaining an ambient temperature within the range of 400° to 700° F. during the transfer and thereby maintaining the articles at a red heat, grounding the articles during their passage adjacent to said electrical element, insulating said element from ground and causing each of said articles to change the magnitude of oscillations in an oscillator circuit by the change of capacitance in the capacitor formed by each passing article and the adjacent electrically conductive element, rectifying the output of the oscillator circuit, the change in magnitude of the oscillations decreasing the rectified output during the passage of each article, applying the rectified output to the grid of a thyratron and thereby causing the thyratron to fire.

8. The method defined in claim 7, said method including the step of actuating a counter by current supplied in the plate circuit of the thyratron when the latter fired.

References Cited in the file of this patent

UNITED STATES PATENTS

| | | |
|---|---|---|
| 1,980,816 | McDill | Nov. 13, 1934 |
| 2,094,351 | Draper et al. | Sept. 28, 1937 |
| 2,108,202 | Kelly | Feb. 15, 1938 |
| 2,152,296 | Weis et al. | Mar. 28, 1939 |
| 2,386,942 | Edelman | Oct. 16, 1945 |
| 2,435,880 | Eilenberger | Feb. 10, 1948 |
| 2,543,570 | Eder | Feb. 27, 1951 |